United States Patent
Ting (10) Patent No.: US 10,691,914 B2
(45) Date of Patent: Jun. 23, 2020

(54) OPTICAL FINGERPRINT SENSING UNIT AND MANUFACTURING METHOD THEREOF

(71) Applicant: Primax Electronics Ltd., Taipei (TW)

(72) Inventor: Kuan-Pao Ting, Taipei (TW)

(73) Assignee: PRIMAX ELECTRONICS LTD, Taipei (TW)

( * ) Notice: Subject to any disclaimer, the term of this patent is extended or adjusted under 35 U.S.C. 154(b) by 247 days.

(21) Appl. No.: 15/879,828

(22) Filed: Jan. 25, 2018

(65) Prior Publication Data

US 2019/0095673 A1   Mar. 28, 2019

(30) Foreign Application Priority Data

Sep. 28, 2017 (TW) .............................. 106133429 A (51) Int. Cl.
   *G06K 9/00*   (2006.01)
   *G06F 3/041*  (2006.01)
   *G06K 9/22*   (2006.01)

(52) U.S. Cl.
   CPC ......... *G06K 9/0004* (2013.01); *G06F 3/0412* (2013.01); *G06K 9/00087* (2013.01); *G06K 9/22* (2013.01)

(58) Field of Classification Search
   None
   See application file for complete search history.

(56) References Cited

U.S. PATENT DOCUMENTS

| | | | | |
|---|---|---|---|---|
| 9,501,686 | B2* | 11/2016 | Lin | G06K 9/0004 |
| 9,811,713 | B2* | 11/2017 | Pi | G06F 21/32 |
| 10,147,757 | B2* | 12/2018 | Lee | G06K 9/0004 |
| 10,381,387 | B2* | 8/2019 | Mainguet | H01L 27/14678 |
| 10,521,641 | B2* | 12/2019 | Pi | G06F 21/32 |
| 2015/0369661 | A1* | 12/2015 | Lin | G06K 9/0004 250/227.11 |
| 2016/0254312 | A1* | 9/2016 | Lee | G06K 9/0004 382/125 |
| 2018/0075283 | A1* | 3/2018 | You | H01L 27/14678 |
| 2018/0151641 | A1* | 5/2018 | Choo | H04M 1/0266 |
| 2018/0260602 | A1* | 9/2018 | He | G06K 9/0008 |
| 2018/0269240 | A1* | 9/2018 | Mainguet | G06K 9/00013 |
| 2019/0179462 | A1* | 6/2019 | Ting | G06F 3/0412 |
| 2019/0189644 | A1* | 6/2019 | Wang | G06F 3/0416 |

* cited by examiner

*Primary Examiner* — Anand P Bhatnagar
(74) *Attorney, Agent, or Firm* — Kirton McConkie; Evan R. Witt (57) ABSTRACT

An optical fingerprint sensing unit includes a substrate, a circuit pattern, an optical fingerprint sensing chip, an encapsulation layer and a fiber-optic layer. The circuit pattern is formed on a surface of the substrate. The optical fingerprint sensing chip is fixed on the substrate. The optical fingerprint sensing chip is electrically connected with the circuit pattern through a metal wire. The optical fingerprint sensing chip, the circuit pattern and the metal wire are covered by the encapsulation layer. The fiber-optic layer is disposed on the encapsulation layer. After a UV-curable optically clear adhesive is subjected to a light-curing reaction, the encapsulation layer is formed.

9 Claims, 9 Drawing Sheets

OPTICAL FINGERPRINT SENSING UNIT AND MANUFACTURING METHOD THEREOF

FIELD OF THE INVENTION

The present invention relates to a fingerprint sensing unit, and more particularly to an optical fingerprint sensing unit and a manufacturing method thereof.

BACKGROUND OF THE INVENTION

Recently, a fingerprint identification module has gradually become an essential component of an electronic device. The fingerprint identification module is used to recognize the identity of the user. Consequently, the user can unlock or control the electronic device through the fingerprint identification module.

Generally, the fingerprint identification module detects the fingerprint according to a capacitive fingerprint sensing technology or an optical fingerprint sensing technology. The optical fingerprint sensing technology was developed earlier. In accordance with the optical fingerprint sensing technology, an optical fingerprint sensing unit captures the light beam that is reflected from the surface of the finger, and compares the brightness/darkness difference between the fingerprint crests and the fingerprint troughs to obtain the texture details of the fingerprint of the finger. In comparison with the capacitive sensing chip of the capacitive fingerprint sensing unit, the optical fingerprint sensing chip of the optical fingerprint sensing unit is more cost-effective and more durable. For example, in the place requiring a great number of fingerprint identification modules (e.g., the exit and entry gates in the airport), the optical fingerprint sensing chips are favored.

However, the conventional process of packaging the optical fingerprint sensing unit is very complicated. Consequently, mass production of the optical fingerprint sensing unit is difficult.

Therefore, there is a need of providing an optical fingerprint sensing unit that is suitable for mass production.

SUMMARY OF THE INVENTION

The present invention provides an optical fingerprint sensing unit, a manufacturing method of the optical fingerprint sensing unit, and a touch screen with an optical fingerprint sensing unit.

In accordance with an aspect of the present invention, there is provided a method for manufacturing an optical fingerprint sensing unit. The method includes the following steps. In a step (a), a fixture is provided. The fixture includes a positioning post. The positioning post includes a first sheathing end and a second sheathing end. In a step (b), a chip board is provided. The chip board includes a substrate, plural optical fingerprint sensing chips, a circuit pattern and a first positioning hole. The first positioning hole is sheathed around the first sheathing end of the positioning post, so that the chip board is fixed on the fixture. In a step (c), a first optically clear adhesive is coated on periphery regions of the plural optical fingerprint sensing chips and the circuit pattern, so that an anti-overflow structure is formed. In a step (d), a second optically clear adhesive is filled in a region that is enclosed by the anti-overflow structure. In a step (e), the first optically clear adhesive and the second optically clear adhesive are imprinted and light-cured, so that an encapsulation layer is formed. In a step (f), a third optically clear adhesive is coated on a surface of the encapsulation layer. In a step (g), a fiber-optic plate is provided. The fiber-optic plate includes a second positioning hole. After the second positioning hole is sheathed around the second sheathing end of the positioning post, the fiber-optic plate is fixed on the surface of the encapsulation layer that is coated with the third optically clear adhesive. In a step (h), the fiber-optic plate is imprinted and the third optically clear adhesive is light-cured, so that the fiber-optic plate and the encapsulation layer are combined together. In a step (i), the chip board is baked. In a step (j), the chip board is cut to produce an optical fingerprint sensing unit.

Preferably, in the step (a), the positioning post is located at two opposite corners on a surface of the fixture. Moreover, a diameter of the first sheathing end is larger than a diameter of the second sheathing end.

Preferably, in the step (a), the positioning post is located at two opposite sides on a surface of the fixture. Moreover, a diameter of the first sheathing end is larger than a diameter of the second sheathing end.

Preferably, in the step (a), the positioning post is located at any corner and any side on a surface of the fixture. Moreover, a diameter of the first sheathing end is larger than a diameter of the second sheathing end.

Preferably, in the step (b), a diameter of the first positioning hole is equal to a diameter of the first sheathing end.

Preferably, in the step (b), the circuit pattern is formed on the surface of the substrate, and the plural optical fingerprint sensing chips are fixed on the substrate and connected with the circuit pattern through a metal wire.

Preferably, in the step (c), a viscosity of the first optically clear adhesive is higher than 30000 mPa·s, and a transmittance of the first optically clear adhesive is higher than 99%.

Preferably, in the step (d), the plural optical fingerprint sensing chips, the circuit pattern and the metal wire are covered by the second optically clear adhesive.

Preferably, in the step (d), a viscosity of the second optically clear adhesive is lower than 4000 mPa·s, and a transmittance of the second optically clear adhesive is higher than 99%.

Preferably, in the step (e), an imprinting device is provided to imprint and light-cure the first optically clear adhesive and the second optically clear adhesive. The imprinting device includes a UV lamp, an imprinting roller and an optical film arranging module.

In an embodiment, the optical film arranging module includes a first roller, a second roller and an optical film. A transmittance of the optical film is higher than 95%. The optical film is arranged on a surface of the first optically clear adhesive and a surface of the second optically clear adhesive by the first roller and the second roller.

In an embodiment, the imprinting roller presses the optical film so as to imprint the first optically clear adhesive and the second optically clear adhesive.

In an embodiment, the UV lamp emits UV light with a wavelength of 365 nm. The UV light is transmitted through the optical film to light-cure the first optically clear adhesive and the second optically clear adhesive, so that the encapsulation layer is produced.

Preferably, in the step (f), a viscosity of the third optically clear adhesive is lower than 4000 mPa·s, and a transmittance of the third optically clear adhesive is higher than 99%.

Preferably, in the step (g), a diameter of the second positioning hole is equal to a diameter of the second sheathing end.

Preferably, in the step (g), the fiber-optic plate comprises plural fiber-optic catheters, and the plural fiber-optic catheters comprise plural chambers, respectively.

In an embodiment, a diameter of each fiber-optic catheter is in a range between 125 µm and 380 µm, and a diameter of the chamber is in a range between 10 µm and 200 µm.

In an embodiment, the diameter of each fiber-optic catheter is 125 µm, and the diameter of the chamber is 10 µm.

In an embodiment, the diameter of each fiber-optic catheter is 125 µm, and the diameter of the chamber is in a range between 50 µm and 100 µm.

In an embodiment, the diameter of each fiber-optic catheter is 385 µm, and the diameter of the chamber is 200 µm.

In an embodiment, while the fiber-optic plate is imprinted in the step (h), the third optically clear adhesive flows and fills into the chambers.

Preferably, in the step (h) of light-curing the third optically clear adhesive, the third optically clear adhesive in the chambers is subjected to a light-curing reaction, so that the plural fiber-optic catheters are formed as solid light guide structures.

Preferably, in the step (h), an imprinting device is provided to imprint the fiber-optic plate and light-cure the third optically clear adhesive. The imprinting device includes a UV lamp, an imprinting roller and an optical film arranging module.

In an embodiment, the optical film arranging module includes a first roller, a second roller and an optical film. A transmittance of the optical film is higher than 95%. The optical film is arranged on the fiber-optic plate by the first roller and the second roller.

In an embodiment, the imprinting roller presses the optical film so as to imprint the fiber-optic plate.

In an embodiment, the UV lamp emits UV light with a wavelength of 400 nm. The UV light is transmitted through the optical film to light-cure the third optically clear adhesive, so that the fiber-optic plate and the encapsulation layer are combined together.

Preferably, in the step (i), the chip board is baked at 80 C.° for 15 minutes.

Preferably, in the step (j), the chip board is cut into the optical fingerprint sensing unit by a laser cutting process.

In accordance with another aspect of the present invention, there is provided an optical fingerprint sensing unit. The optical fingerprint sensing unit includes a substrate, a circuit pattern, an optical fingerprint sensing chip, an encapsulation layer and a fiber-optic layer. The circuit pattern is formed on a surface of the substrate. The optical fingerprint sensing chip is fixed on the substrate. The optical fingerprint sensing chip is electrically connected with the circuit pattern through a metal wire. The optical fingerprint sensing chip, the circuit pattern and the metal wire are covered by the encapsulation layer. The fiber-optic layer is disposed on the encapsulation layer. After a UV-curable optically clear adhesive is subjected to a light-curing reaction, the encapsulation layer is formed.

In an embodiment, the fiber-optic layer includes plural fiber-optic catheters, and the plural fiber-optic catheters include plural chambers, respectively.

In an embodiment, the UV-curable optically clear adhesive is filled in the chambers. Moreover, the plural fiber-optic catheters are formed as solid light guide structures after the UV-curable optically clear adhesive is subjected to the light-curing reaction.

In an embodiment, a diameter of each fiber-optic catheter is in a range between 125 µm and 380 µm, and a diameter of the chamber is in a range between 10 µm and 200 µm.

In an embodiment, the diameter of each fiber-optic catheter is 125 µm, and the diameter of the chamber is 10 µm.

In an embodiment, the diameter of each fiber-optic catheter is 125 µm, and the diameter of the chamber is in a range between 50 µm and 100 µm.

In an embodiment, the diameter of each fiber-optic catheter is 385 µm, and the diameter of the chamber is 200 µm.

In an embodiment, a thickness of the encapsulation layer is in a range between 0.5 mm and 0.85 mm.

In an embodiment, a thickness of the fiber-optic layer is in a range between 0.2 mm and 0.5 mm.

In accordance with a further aspect of the present invention, there is provided a touch screen with a fingerprint identification module. The touch screen includes an organic light emitting diode display device, an optical fingerprint sensing unit and a flexible printed circuit board. The organic light emitting diode display device has a first surface and a second surface. The first surface is touchable by a finger. The second surface is opposed to the first surface. The optical fingerprint sensing unit is fixed on the second surface. The optical fingerprint sensing unit includes a substrate, a circuit pattern, an optical fingerprint sensing chip, an encapsulation layer and a fiber-optic layer. The circuit pattern is formed on a surface of the substrate. The optical fingerprint sensing chip is fixed on the substrate. The optical fingerprint sensing chip is electrically connected with the circuit pattern through a metal wire. The optical fingerprint sensing chip, the circuit pattern and the metal wire are covered by the encapsulation layer. The fiber-optic layer is disposed on the encapsulation layer. The substrate is fixed on the flexible printed circuit board. The flexible printed circuit board is electrically connected with the substrate. After a UV-curable optically clear adhesive is subjected to a light-curing reaction, the encapsulation layer is formed.

In an embodiment, the fiber-optic layer includes plural fiber-optic catheters, and the plural fiber-optic catheters include plural chambers, respectively.

In an embodiment, the UV-curable optically clear adhesive is filled in the chambers. Moreover, the plural fiber-optic catheters are formed as solid light guide structures after the UV-curable optically clear adhesive is subjected to the light-curing reaction.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
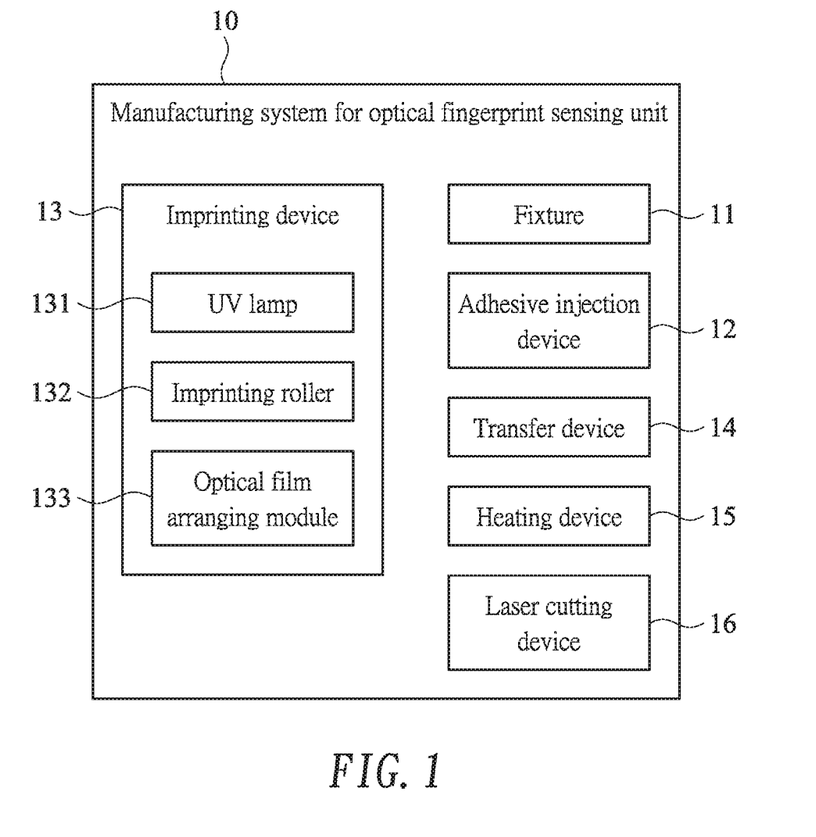
FIG. 1 is a schematic block diagram illustrating the architecture of a manufacturing system for an optical fingerprint sensing unit according to an embodiment of the present invention.

FIG. 1 is a schematic block diagram illustrating the architecture of a manufacturing system for an optical fingerprint sensing unit according to an embodiment of the present invention. As shown in FIG. 1, the manufacturing system 10 comprises a fixture 11, an adhesive injection device 12, an imprinting device 13, a transfer device 14, a heating device 15 and a laser cutting device 16. Moreover, the imprinting device 13 comprises a UV lamp 131, an imprinting roller 132 and an optical film arranging module 133.

Figure 2:
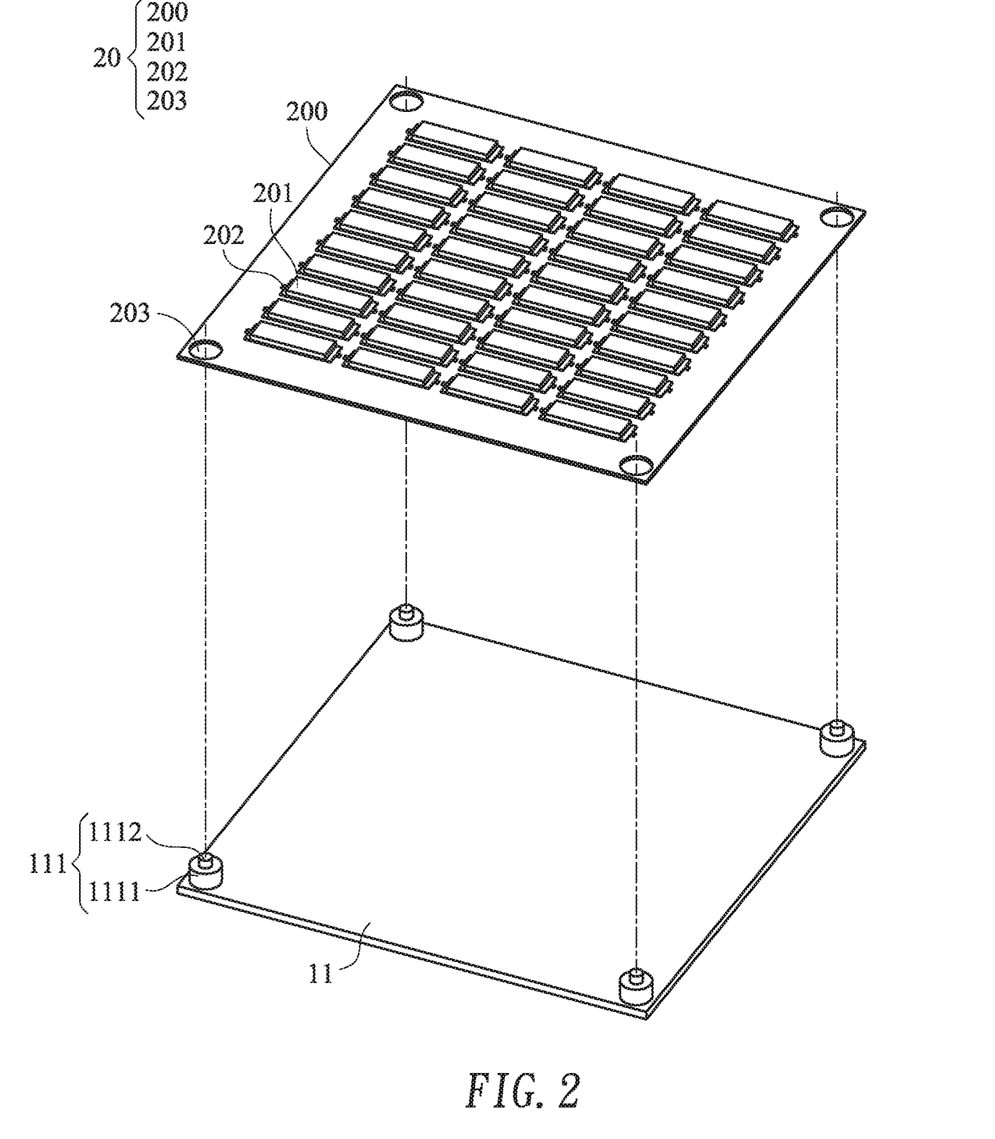
FIG. 2 is a schematic perspective view illustrating the use of the fixture to fix a chip board.

Please refer to FIGS. 1 and 2. FIG. 2 is a schematic perspective view illustrating the use of the fixture to fix a chip board. As shown in FIG. 2, the fixture 11 for fixing the chip board 20 comprises four positioning posts 111. The positioning posts 111 are located at four corners of a surface of the fixture 11. Each positioning post 111 comprises a first sheathing end 1111 and a second sheathing end 1112, which are coaxial with each other. The diameter of the first sheathing end 1111 is larger than the diameter of the second sheathing end 1112. The chip board 20 comprises a substrate 200, plural optical fingerprint sensing chips 201, a circuit pattern 202 and plural first positioning holes 203. The circuit pattern 202 is formed on a surface of the substrate 200. The optical fingerprint sensing chips 201 are fixed on the substrate 20 by an adhering means or a welding means. Moreover, the optical fingerprint sensing chips 201 are electrically connected with the power supply circuit of the circuit pattern 202 through metal wires (not shown). For example, the metal wires are gold wires, copper wires, silver wires or alloy wires. The first positioning holes 203 run through the substrate 200. Moreover, the first positioning holes 203 are aligned with the corresponding positioning posts 111 of the fixture 11. Preferably, the diameter of the first positioning hole 203 is equal to the diameter of the first sheathing end 1111 of the positioning post 111.

Please refer to FIG. 2 again. The transfer device 14 of the manufacturing system 10 is used for transferring the chip board 20 and placing the chip board 20 on the fixture 11. While the chip board 20 is placed on the fixture 11, the positioning posts 111 of the fixture 11 are penetrated through the corresponding first positioning holes 203 of the substrate 200. That is, the first positioning holes 203 are sheathed around the first sheathing ends 1111 of the corresponding positioning posts 111. Consequently, the chip board 20 is fixed on the fixture 11. For example, the transfer device 14 is a clamp-type robotic arm or a vacuum-suction robotic arm. Moreover, the transfer device 14 has the degree of freedom allowing for three-dimensional movement.

In the above embodiment, the positioning posts 111 are located at the four corners of the fixture 11. In practice, the number and positions of the positioning posts 111 may be varied according to the size of the chip board 20 and the fixing requirement. For example, at least one positioning post 111 is located at each of two opposite corners on the fixture 11, or at least one positioning post 111 is located at each of two opposite sides of the fixture 11, or at least one positioning post 111 is located at one corner and one side of the fixture 11. Moreover, the first positioning holes 203 of the chip board 20 corresponding to the positioning posts 111 are determined according to the umber and the positions of the positioning post 111.

Please refer to FIG. 1 and FIGS. 3A to 3D. FIGS. 3A to 3D schematically illustrate a process of forming an encapsulation layer on the chip board according to the embodiment of the present invention.

Figure 3A:
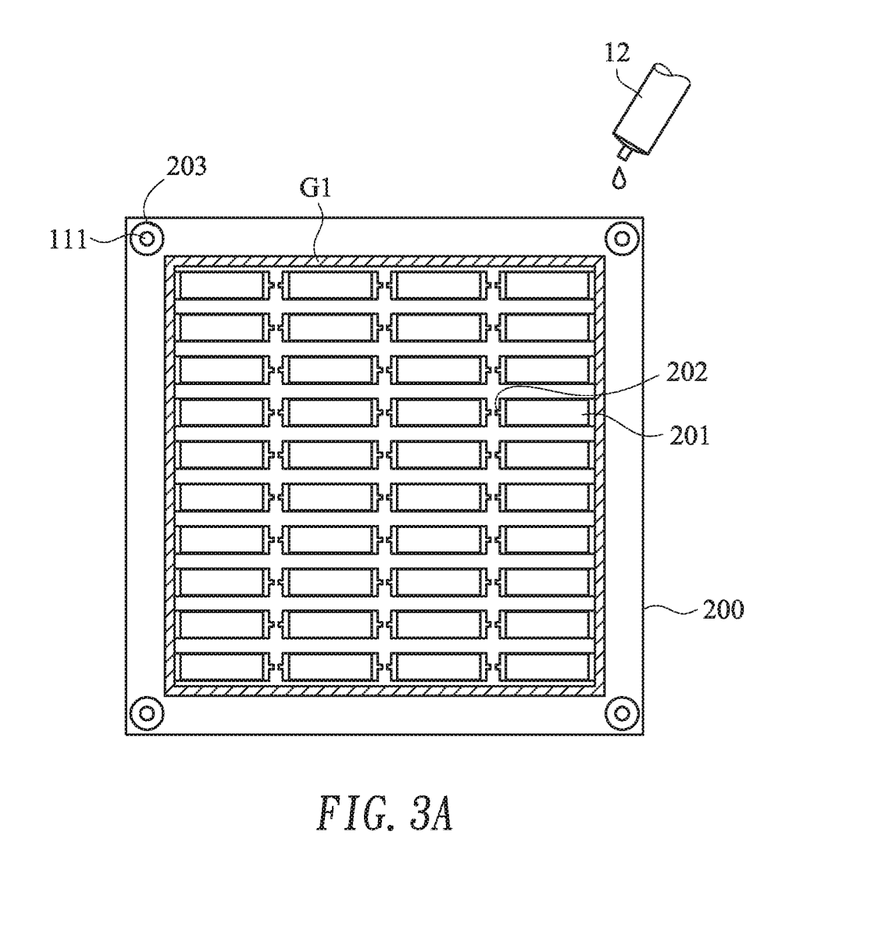
FIGS. 3A to 3D schematically illustrate a process of forming an encapsulation layer on the chip board according to the embodiment of the present invention.

Please refer to FIG. 3A. After the chip board 20 is fixed on the fixture 11, the adhesive injection device 12 is employed to coat a first optically clear adhesive (OCA) G1 on the periphery regions of the optical fingerprint sensing chips 201 and the circuit pattern 202. Consequently, an anti-overflow structure is formed to enclose the optical fingerprint sensing chips 201 and the circuit pattern 202. The first optically clear adhesive G1 is a UV-curable adhesive. Moreover, the composition of the first optically clear adhesive G1 contains modified acrylate and photosensitizer. Preferably, the viscosity of the first optically clear adhesive G1 is higher than 30000 mPa·s, and the transmittance of the first optically clear adhesive G1 is higher than 99%. Due to the high viscosity, the first optically clear adhesive G1 has a higher viscous force. Consequently, the anti-overflow structure formed of the first optically clear adhesive G1 is firm and has low flowability.

Figure 3B:
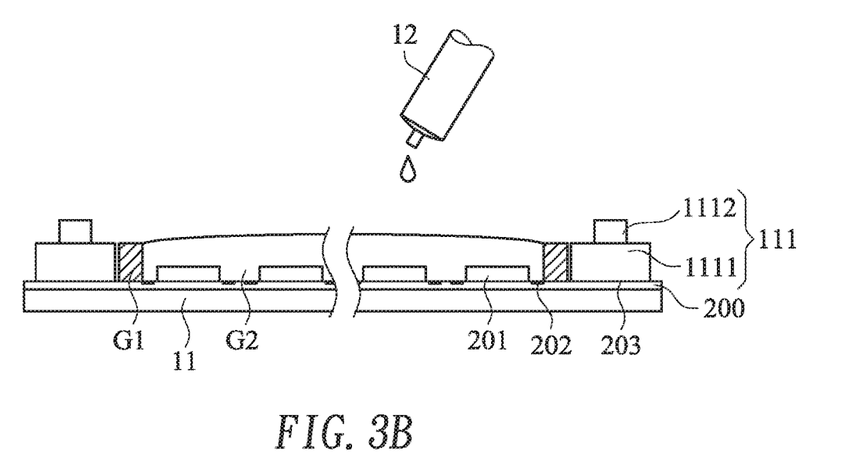

Please refer to FIG. 3B. After the anti-overflow structure is formed of the first optically clear adhesive to enclose the plural optical fingerprint sensing chips 201 and the circuit pattern 202, the adhesive injection device 12 is employed to fill a second optically clear adhesive G2 in the region that is enclosed by the anti-overflow structure. Consequently, the plural optical fingerprint sensing chips 201 and the circuit pattern 202 are covered by the second optically clear adhesive G2. Moreover, the anti-overflow structure formed of the first optically clear adhesive G1 is able to prevent from the overflowing condition of the second optically clear adhesive G2. The second optically clear adhesive G2 is also a UV-curable adhesive. Moreover, the composition of the second optically clear adhesive G2 contains modified acrylate and photosensitizer. Preferably, the viscosity of the second optically clear adhesive G2 is lower than 4000 mPa·s, and the transmittance of the second optically clear adhesive G2 is higher than 99%. Due to the low viscosity, the second optically clear adhesive G2 has a lower viscous force. Consequently, the second optically clear adhesive G2 has higher flowability. Since the second optically clear adhesive G2 has the higher flowability, the second optically clear adhesive G2 can be quickly distributed and spread on the layout area of the plural optical fingerprint sensing chips 201 and the circuit pattern 202. Moreover, since the second optically clear adhesive G2 has the higher flowability, the vacant spaces between the plural optical fingerprint sensing chips 201 and the circuit pattern 202 are completely filled with the second optically clear adhesive G2. Under this circumstance, the possibility of generating bubbles is minimized.

Figure 3C:
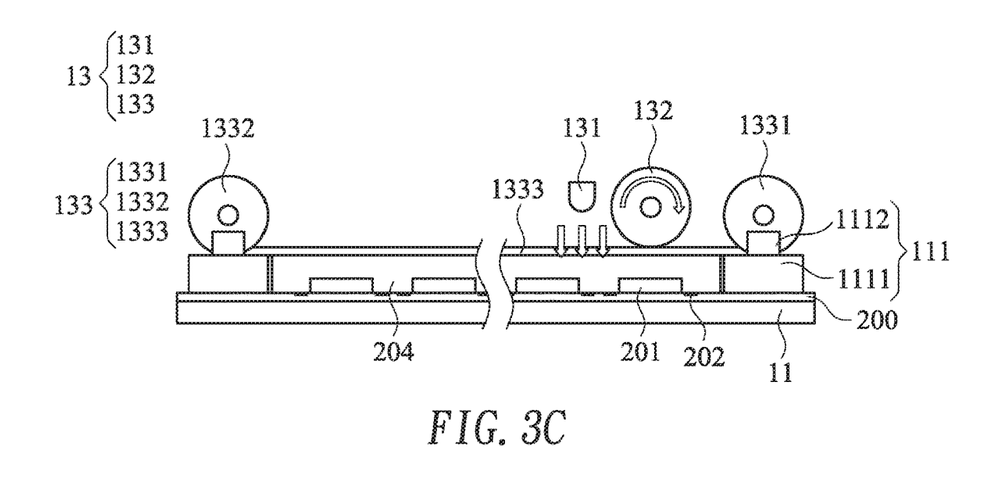

Please refer to FIG. 3C. After the step of filling the second optically clear adhesive G2 is completed, the imprinting device 13 is employed to imprint the first optically clear adhesive G1 and the second optically clear adhesive G2. As shown in FIG. 3C, the structure of the optical film arranging module 133 is similar to a reel. In an embodiment, the optical film arranging module 133 comprises a first roller 1331, a second roller 1332 and an optical film 1333. The transmittance of the optical film 1333 is higher than 95%. Moreover, the optical film 1333 is wound around the outer surface of the first roller 1331 or the second roller 1332.

During the imprinting process, the optical film 1333 is rolled out from the first roller 1331 or the second roller 1332, and the optical film 1333 is arranged on the surface of the first optically clear adhesive G1 and the surface of the second optically clear adhesive G2 by the first roller 1331 and the second roller 1332. Consequently, an imprint interface to be imprinted by the imprinting roller 132 is defined. Then, the imprinting roller 132 is employed to roll and press the optical film 1333 in order to imprint the first optically clear adhesive G1 and the second optically clear adhesive G2. While the imprinting roller 132 performs the imprinting process, the UV lamp 131 is turned on to emit UV light. Since the optical film 1333 has the high transmittance, the UV light is transmitted through the optical film 1333 and irradiated on the first optically clear adhesive G1 and the second optically clear adhesive G2. Under this circumstance, the first optically clear adhesive G1 and the second optically clear adhesive G2 are subjected to light-curing reactions. Consequently, an encapsulation layer 204 is formed to cover the plural optical fingerprint sensing chips 201 and the circuit pattern 202. In an embodiment, the wavelength of the UV light from the UV lamp 131 is 365 nm.

Figure 3D:
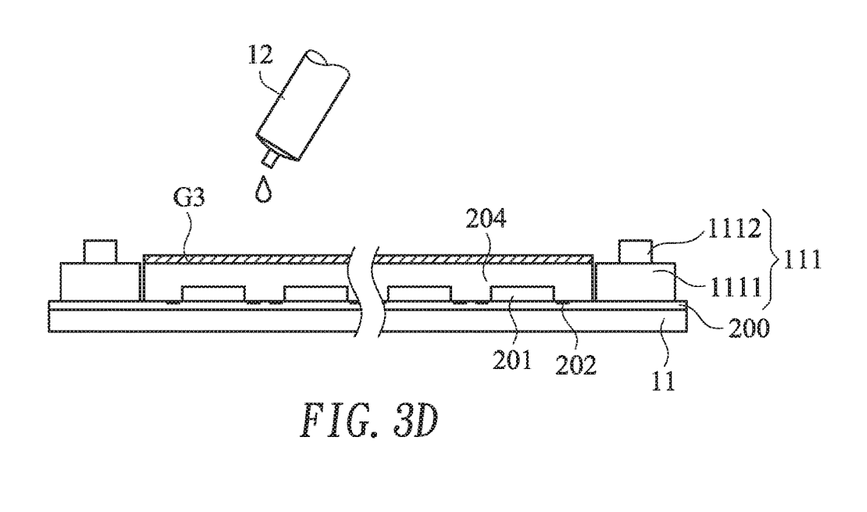

Please refer to FIG. 3D. After the encapsulation layer 204 is formed, the adhesive injection device 12 is employed to coat a third optically clear adhesive G3 on a surface of the encapsulation layer 204. The third optically clear adhesive G3 is also a UV-curable adhesive. Moreover, the composition of the third optically clear adhesive G3 contains modified acrylate and photosensitizer. Preferably, the viscosity of the third optically clear adhesive G3 is also lower than 4000 mPa·s, and the transmittance of the third optically clear adhesive G3 is higher than 99%. Due to the low viscosity, the third optically clear adhesive G3 has a lower viscous force and better flowability.

Please refer to FIG. 1 and FIGS. 4A to 4F. FIGS. 4A to 4F schematically illustrate a process of forming a fiber-optic plate on the encapsulation layer according to the embodiment of the present invention.

Figure 4A:
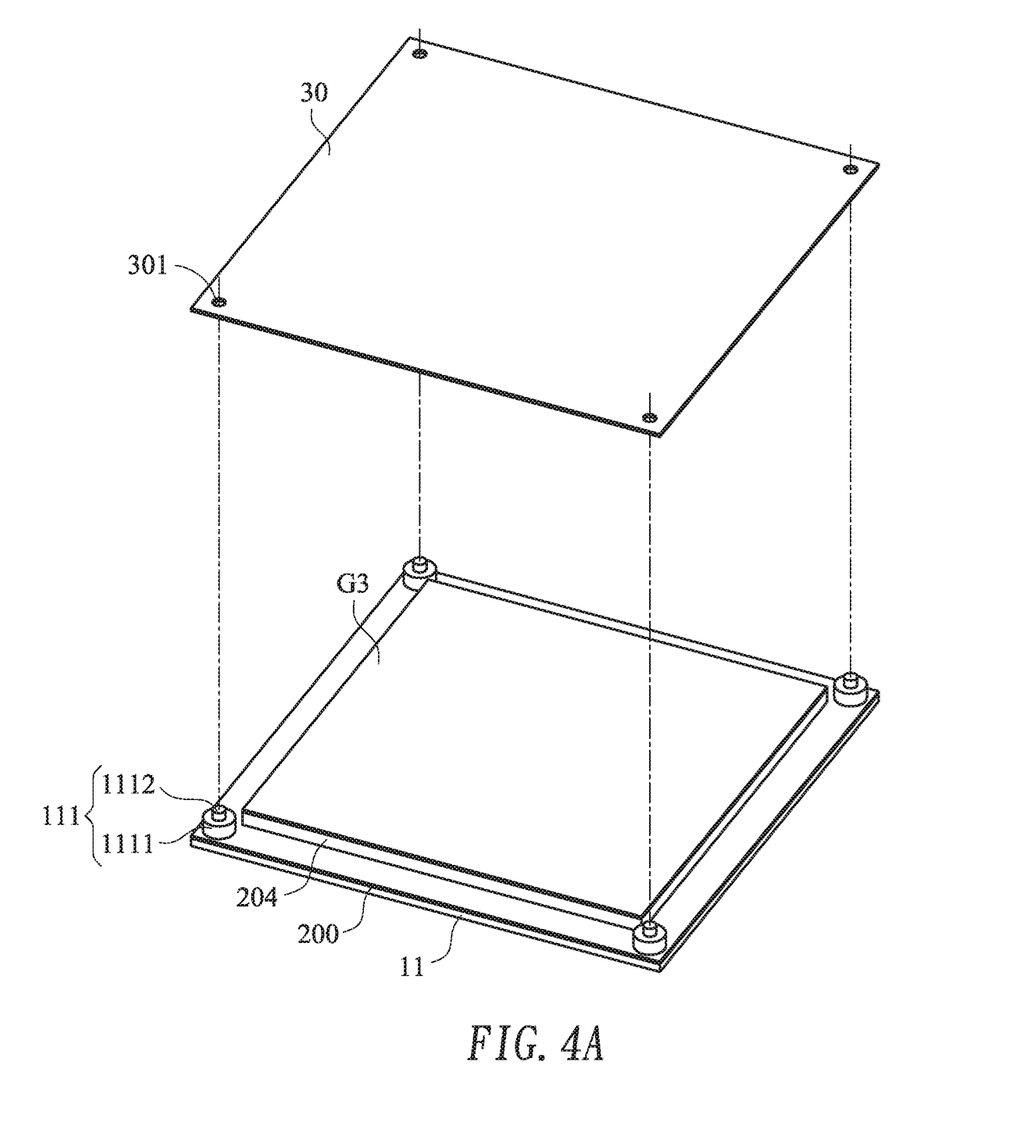
FIGS. 4A to 4F schematically illustrate a process of forming a fiber-optic plate on the encapsulation layer according to the embodiment of the present invention.

Please refer to FIG. 4A. A fiber-optic plate 30 is provided. The fiber-optic plate 30 comprises plural second positioning holes 301 corresponding to the positioning posts 111 of the fixture 11. Preferably, the diameter of the second positioning hole 301 is equal to diameter of the second sheathing end 1112 of the positioning post 111. As the fiber-optic plate 30 is moved by the transfer device 14, the fiber-optic plate 30 is placed on the fixture 11. While the fiber-optic plate 30 is placed on the fixture 11, the second sheathing ends 1112 of the positioning posts 111 are penetrated through the corresponding second positioning holes 301 of the fiber-optic plate 30. Since the diameter of the first sheathing end 111 is larger than the diameter of the second sheathing end 1112, the fiber-optic plate 30 is locked on the junctions between the first sheathing ends 111 and the corresponding second sheathing ends 1112. That is, the second positioning holes 301 of the fiber-optic plate 30 are sheathed around the second sheathing ends 1112 of the corresponding positioning posts 111. Consequently, the fiber-optic plate 30 is fixed on the surface of the encapsulation layer 204 that is coated with the third optically clear adhesive G3. Similarly, the second positioning holes 301 of the fiber-optic plate 30 corresponding to the positioning posts 111 are determined according to the umber and the positions of the positioning post 111.

Figure 4B:
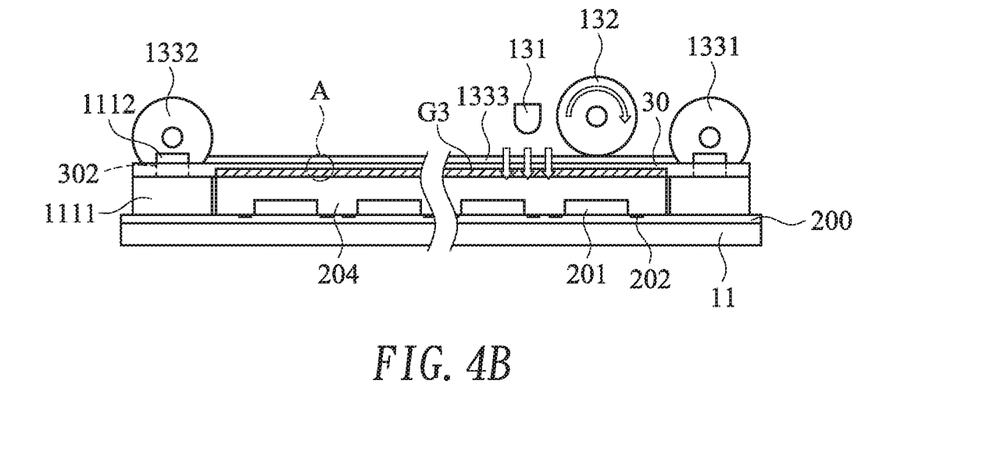

Please refer to FIG. 4B. After the fiber-optic plate 30 is fixed on the fixture 11, the fiber-optic plate 30 is fixed on the surface of the encapsulation layer 204 that is coated with the third optically clear adhesive G3. Then, the imprinting device 13 is employed to imprint the fiber-optic plate 30. As shown in FIG. 4B, the optical film 1333 is arranged on the surface of the fiber-optic plate 30 by the first roller 1331 and the second roller 1332. Then, the imprinting roller 132 is employed to roll and press the optical film 1333 in order to imprint the fiber-optic plate 30. While the imprinting roller 132 performs the imprinting process, the UV lamp 131 is turned on to emit UV light. For example, the wavelength of the UV light from the UV lamp 131 is 400 nm. The UV light is irradiated on the third optically clear adhesive G3, which is arranged between the encapsulation layer 204 and the fiber-optic plate 30. Under this circumstance, the third optically clear adhesive G3 is subjected to a light-curing reaction. Consequently, the fiber-optic plate 30 and the encapsulation layer 204 are combined together.

Figure 4C:
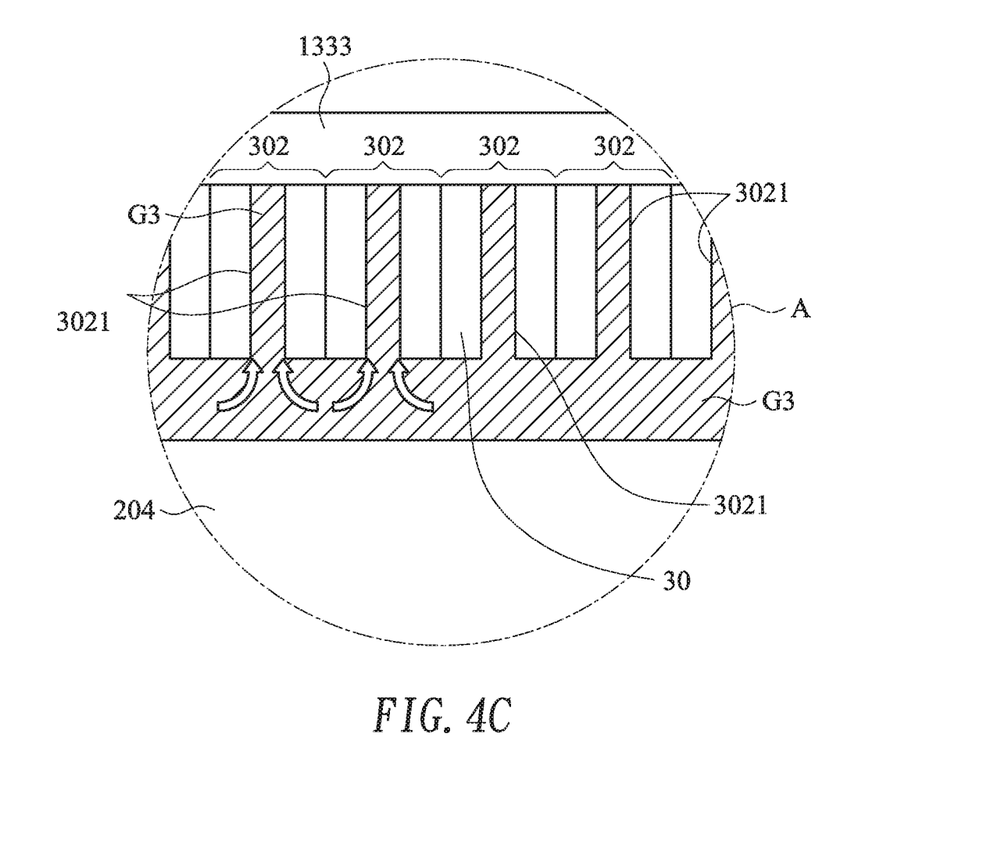

Please refer to FIG. 4C. FIG. 4C is a schematic enlarged view of the region A as shown in FIG. 4B. As shown in FIG. 4C, the fiber-optic plate 30 comprises plural fiber-optic catheters 302, which are arranged side by side. Each of the plural fiber-optic catheters 302 comprises a chamber 3021. The diameter of the fiber-optic catheter 302 is in a range between 125 μm and 380 μm, and the diameter of the chamber 3021 is in a range between 10 μm and 200 μm. In an embodiment, the diameter of the fiber-optic catheter 302 is 125 μm, and the diameter of the chamber 3021 is 10 μm. In another embodiment, the diameter of the fiber-optic catheter 302 is 125 μm, and the diameter of the chamber 3021 is in a range between 50 μm and 100 μm. In a further embodiment, the diameter of the fiber-optic catheter 302 is 380 μm, and the diameter of the chamber 3021 is 200 μm. During the process of manufacturing the optical fingerprint sensing unit, the diameter of the fiber-optic catheter 302 and the diameter of the chamber 3021 in the fiber-optic plate 30 may be determined according to the type of the optical fingerprint sensing chip 201. Consequently, the amount of the light to be projected to the optical fingerprint sensing chip 201 is adjustable.

Please refer to FIG. 4C. As mentioned above, the third optically clear adhesive G3 coated on the surface of the encapsulation layer 204 has the lower viscous force. Consequently, during the process of imprinting the fiber-optic plate 30, the third optically clear adhesive G3 has better flowability. While the imprinting roller 132 presses the optical film 1333 to imprint the fiber-optic plate 30, the third optically clear adhesive G3 in the region between the encapsulation layer 204 and the fiber-optic plate 30 flows to the chambers 3021 of the fiber-optic catheters 302 because of a capillary phenomenon or an extrusion effect and fills into the chambers 3021. Then, in the process of irradiating the UV light on the third optically clear adhesive G3, the portion of the third optically clear adhesive G3 in the chambers 3021 is also subjected to the light-curing reaction. Consequently, the fiber-optic catheters 302 are formed as solid light guide structures.

Figure 4D:
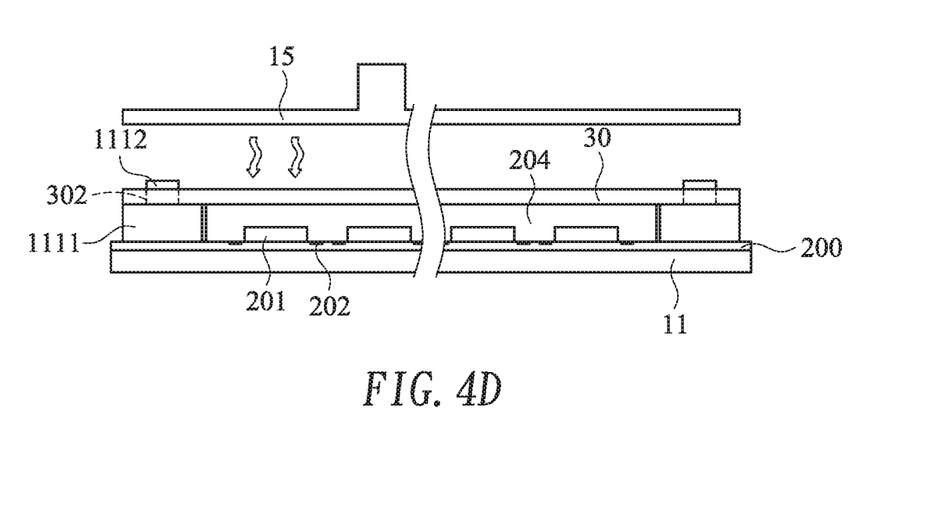

Please refer to FIG. 4D. After the fiber-optic plate 30 and the encapsulation layer 204 are combined together, the heating device 15 is employed to bake the chip board 20. For example, the heating device 15 bakes the first optically clear adhesive G1, the second optically clear adhesive G2 and the third optically clear adhesive G3 at 80 C.° for 15 minutes. Consequently, the light-curing reactions of the first optically clear adhesive G1, the second optically clear adhesive G2 and the third optically clear adhesive G3 are performed more completely.

Figure 4E:
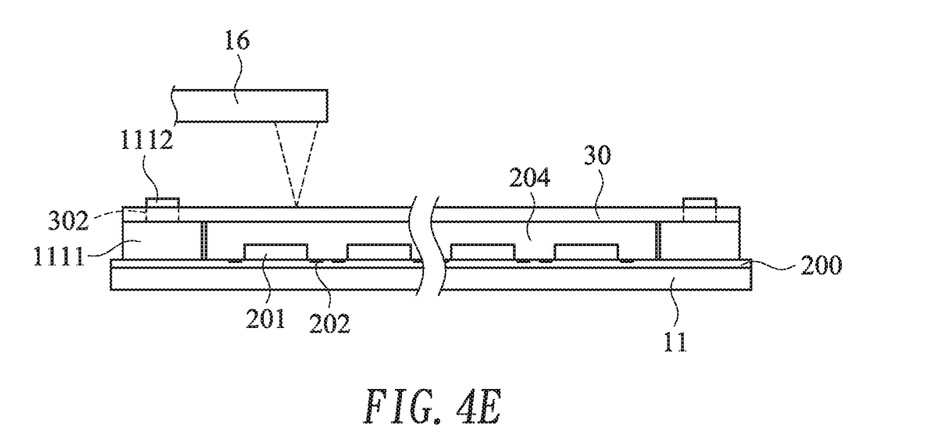

Please refer to FIG. 4E. After the process of backing the chip board 20 is completed, the laser cutting device 16 is employed to cut the imprinted chip board 20. Consequently, plural individual optical fingerprint sensing units 20' are produced.

Figure 4F:
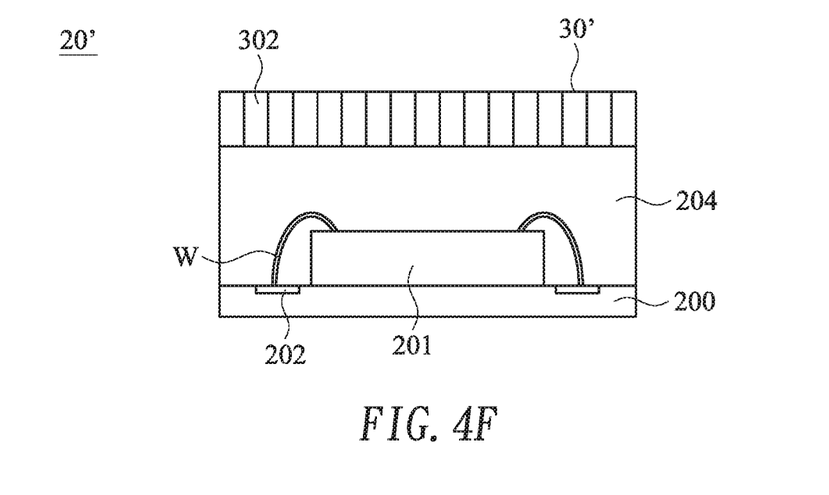

Please refer to FIG. 4F. As mentioned above, the imprinted chip board 20 is cut into plural individual optical fingerprint sensing units by the laser cutting device 16. An optical fingerprint sensing unit 20' is shown in FIG. 4F. The optical fingerprint sensing unit 20' comprises a substrate 200, an optical fingerprint sensing chip 201, a circuit pattern 202, an encapsulation layer 204 and a fiber-optic layer 30'. The circuit pattern 202 is formed on the surface of the substrate 200. The optical fingerprint sensing chip 201 is fixed on the substrate 200. Moreover, the optical fingerprint sensing chip 201 is electrically connected with the power supply circuit of the circuit pattern 202 through metal wires W. The encapsulation layer 204 is formed over the substrate 200 to cover the optical fingerprint sensing chip 201, the circuit pattern 202 and the metal wires W. The fiber-optic layer 30' is obtained from the fiber-optic plate 30 through the cutting process. The fiber-optic layer 30' is disposed over the encapsulation layer 204. Moreover, the fiber-optic layer 30' comprises plural fiber-optic catheters 302. The thickness of the encapsulation layer 204 is in the range between the 0.5 mm and 0.85 mm. The thickness of the fiber-optic layer 30' is in the range between 0.2 mm and 0.5 mm. In a preferred embodiment, the thickness of the fiber-optic layer 30' is 0.3 mm. Moreover, the thickness of the encapsulation layer 204 may be adjusted according to the height of the first sheathing end 1111 of the positioning post 111 of the fixture 10.

Figure 5:
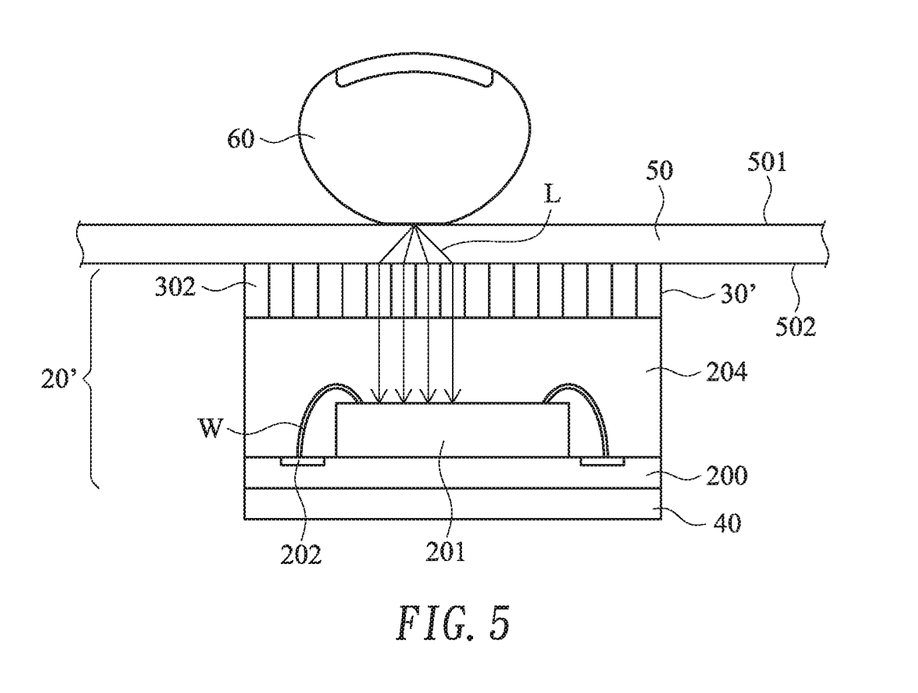
FIG. 5 schematically illustrates a touch screen with the optical fingerprint sensing unit of the present invention.

FIG. 5 schematically illustrates a touch screen with the optical fingerprint sensing unit of the present invention. As shown in FIG. 5, the touch screen comprises an organic light emitting diode (OLED) display device 50, an optical fingerprint sensing unit 20' and a flexible printed circuit board 40. The OLED display device 50 comprises a first surface 501 and a second surface 502. The first surface 501 is touchable by a finger. The second surface 502 is opposed to the first surface 501. The substrate 200 of the optical fingerprint sensing unit 20' and the flexible printed circuit board 40 are combined together through an anisotropic conductive film (ACF) (not shown). Moreover, the substrate 200 is electrically connected with the flexible printed circuit board 40. After the flexible printed circuit board 40 and the substrate 200 are combined together, the optical fingerprint sensing unit 20' is fixed on the second surface 502 of the OLED display device 50. In an embodiment, the second surface 502 of the OLED display device 50 or the surface of the fiber-optic layer 30' of the optical fingerprint sensing unit 20' is coated with a layer of UV curable adhesive (not shown). Then, the UV light is irradiated on the UV curable adhesive between the optical fingerprint sensing unit 20' and the OLED display device 50. Consequently, the UV curable adhesive is subjected to the light-curing reaction. In such way, the optical fingerprint sensing unit 20' is fixed on the second surface 502 of the OLED display device 50.

Please refer to FIG. 5 again. When the light beam from the OLED display device 50 is projected on the finger 60, a reflective light beam L from the finger 60 is transmitted through the OLED display device 50, the solid light guide structures of the fiber-optic catheters 302 (see FIG. 4C) and the encapsulation layer 204 and projected on the optical fingerprint sensing chip 201. After the fingerprint image of the finger 60 is received, the fingerprint image is converted into an electronic signal by the optical fingerprint sensing chip 201, and the electronic signal is outputted through the flexible printed circuit board 40.

Figure 6:
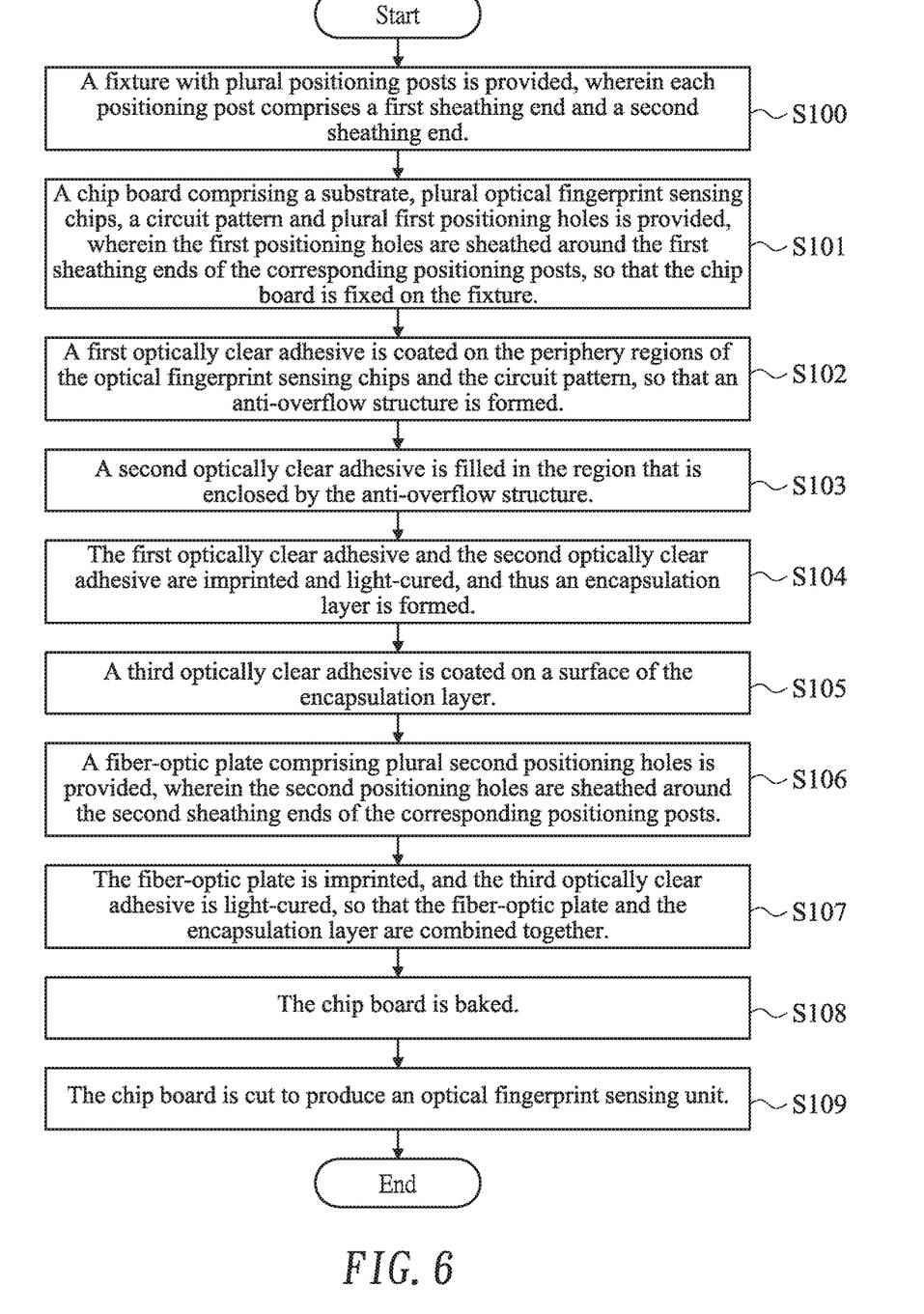
FIG. 6 is flowchart illustrating a method for manufacturing an optical fingerprint sensing unit according to an embodiment of the present invention.

Please refer to FIG. 1, FIG. 2, FIGS. 3A to 3D and FIGS. 4A to 4F. FIG. 6 is flowchart illustrating a method for manufacturing an optical fingerprint sensing unit according to an embodiment of the present invention.

Firstly, a fixture 11 with plural positioning posts 111 is provided, wherein each positioning post 111 comprises a first sheathing end 1111 and a second sheathing end 1112 (Step S100). In the step S100, the first sheathing end 1111 and the second sheathing end 1112 of the positioning post 111 are coaxial with each other. Moreover, the diameter of the first sheathing end 1111 is larger than the diameter of the second sheathing end 1112. The positioning posts 111 are located at two opposite corners or two opposite sides on a surface of the fixture 11. Alternatively, at least one positioning post 111 is located at any corner and any side of the fixture 11.

Then, a chip board 20 comprising a substrate 200, plural optical fingerprint sensing chips 201, a circuit pattern 202 and plural first positioning holes 203 is provided, wherein the first positioning holes 203 are sheathed around the first sheathing ends 1111 of the corresponding positioning posts 111, so that the chip board 20 is fixed on the fixture 11 (Step S101). In the step S101, the chip board 20 is moved by the transfer device 14, and the chip board 20 is placed on the fixture 11. The positioning posts 111 of the fixture 11 are penetrated through the first positioning holes 203 of the substrate 200, and the first positioning holes 203 are sheathed around the first sheathing ends 1111 of the corresponding positioning posts 111. Consequently, the chip board 20 is fixed on the fixture 11.

Then, a first optically clear adhesive G1 is coated on the periphery regions of the optical fingerprint sensing chips 201 and the circuit pattern 202, so that an anti-overflow structure is formed (Step S102). In the step S102, the adhesive injection device 12 is employed to coat the first optically clear adhesive G1 on the periphery regions of the optical fingerprint sensing chips 201 and the circuit pattern 202. Consequently, the anti-overflow structure is formed to enclose the optical fingerprint sensing chips 201 and the circuit pattern 202. The first optically clear adhesive G1 is a UV-curable adhesive. Moreover, the composition of the first optically clear adhesive G1 contains modified acrylate and photosensitizer. Preferably, the viscosity of the first optically clear adhesive G1 is higher than 30000 mPa·s, and the transmittance of the first optically clear adhesive G1 is higher than 99%. Due to the high viscosity, the first optically clear adhesive G1 has a higher viscous force. Consequently, the anti-overflow structure formed of the first optically clear adhesive G1 is firm and has low flowability.

Then, a second optically clear adhesive G2 is filled in the region that is enclosed by the anti-overflow structure (Step S103). In the step S103, the adhesive injection device 12 is employed to fill a second optically clear adhesive G2 in the region that is enclosed by the anti-overflow structure. Consequently, the plural optical fingerprint sensing chips 201 and the circuit pattern 202 are covered by the second optically clear adhesive G2. Moreover, the anti-overflow structure formed of the first optically clear adhesive G1 is able to prevent from the overflowing condition of the second optically clear adhesive G2. The second optically clear adhesive G2 is also a UV-curable adhesive. Moreover, the composition of the second optically clear adhesive G2 contains modified acrylate and photosensitizer. Preferably, the viscosity of the second optically clear adhesive G2 is lower than 4000 mPa·s, and the transmittance of the second optically clear adhesive G2 is higher than 99%. Due to the low viscosity, the second optically clear adhesive G2 has a lower viscous force. Consequently, the second optically clear adhesive G2 has higher flowability. Since the second optically clear adhesive G2 has the higher flowability, the second optically clear adhesive G2 can be quickly distributed and spread on the layout area of the plural optical fingerprint sensing chips 201 and the circuit pattern 202. Moreover, since the second optically clear adhesive G2 has the higher flowability, the vacant spaces between the plural optical fingerprint sensing chips 201 and the circuit pattern 202 are completely filled with the second optically clear adhesive G2. Under this circumstance, the possibility of generating bubbles is minimized.

Then, the first optically clear adhesive G1 and the second optically clear adhesive G2 are imprinted and light-cured, and thus an encapsulation layer 204 is formed (Step S104). In the step S104, the imprinting device 13 is employed to imprint the first optically clear adhesive G1 and the second optically clear adhesive G2. The imprinting device 13 comprises a UV lamp 131, an imprinting roller 132 and an optical film arranging module 133. The optical film arranging module 133 comprises a first roller 1331, a second roller 1332 and an optical film 1333. For imprinting the first optically clear adhesive G1 and the second optically clear adhesive G2, the optical film 1333 is arranged on the surface of the first optically clear adhesive G1 and the surface of the second optically clear adhesive G2 by the first roller 1331 and the second roller 1332, and then the imprinting roller 132 is employed to roll and press the optical film 1333 in order to imprint the first optically clear adhesive G1 and the second optically clear adhesive G2. While the imprinting roller 132 performs the imprinting process, the UV lamp 131 is turned on to emit UV light. The wavelength of the UV light is 365 nm. The UV light is irradiated on the first optically clear adhesive G1 and the second optically clear adhesive G2, and thus the first optically clear adhesive G1 and the second optically clear adhesive G2 are subjected to light-curing reactions. Consequently, an encapsulation layer 204 is formed to cover the plural optical fingerprint sensing chips 201 and the circuit pattern 202.

After the encapsulation layer 204 is formed, a third optically clear adhesive G3 is coated on a surface of the encapsulation layer 204 (Step S105). In the step S105, the adhesive injection device 12 is employed to coat a third optically clear adhesive G3 on a surface of the encapsulation layer 204. The third optically clear adhesive G3 is also a UV-curable adhesive. Moreover, the composition of the third optically clear adhesive G3 contains modified acrylate and photosensitizer. Preferably, the viscosity of the third optically clear adhesive G3 is also lower than 4000 mPa·s, and the transmittance of the third optically clear adhesive G3 is higher than 99%. Due to the low viscosity, the third optically clear adhesive G3 has a lower viscous force and better flowability.

Then, a fiber-optic plate 30 comprising plural second positioning holes 301 is provided, wherein the second positioning holes 301 are sheathed around the second sheathing ends 1112 of the corresponding positioning posts 111 (Step S106). In the step S106, the fiber-optic plate 30 is moved by the transfer device 14, and the fiber-optic plate 30 is placed on the fixture 11. The second sheathing ends 1112 of the positioning posts 111 are penetrated through the corresponding second positioning holes 301 of the fiber-optic plate 30. That is, the second positioning holes 301 of the fiber-optic plate 30 are sheathed around the second sheathing ends 1112 of the corresponding positioning posts 111. Consequently, the fiber-optic plate 30 is fixed on the surface of the encapsulation layer 204 that is coated with the third optically clear adhesive G3. The fiber-optic plate 30 comprises plural fiber-optic catheters 302, which are arranged side by side. Each of the plural fiber-optic catheters 302 comprises a chamber 3021. The diameter of the fiber-optic catheter 302 is in a range between 125 µm and 380 µm, and the diameter of the chamber 3021 is in a range between 10 µm and 200 µm. Similarly, the second positioning holes 301 of the fiber-optic plate 30 corresponding to the positioning posts 111 are determined according to the umber and the positions of the positioning post 111.

Then, the fiber-optic plate 30 is imprinted, and the third optically clear adhesive G3 is light-cured, so that the fiber-optic plate 30 and the encapsulation layer 204 are combined together (Step S107). In the step S107, the optical film 1333 is arranged on the surface of the fiber-optic plate 30 by the first roller 1331 and the second roller 1332. Then, the imprinting roller 132 is employed to roll and press the optical film 1333 in order to imprint the fiber-optic plate 30. While the imprinting roller 132 performs the imprinting process, the UV lamp 131 is turned on to emit UV light. For example, the wavelength of the UV light from the UV lamp 131 is 400 nm. The UV light is irradiated on the third optically clear adhesive G3, which is arranged between the encapsulation layer 204 and the fiber-optic plate 30. Under this circumstance, the third optically clear adhesive G3 is subjected to a light-curing reaction. Consequently, the fiber-optic plate 30 and the encapsulation layer 204 are combined together. Since the third optically clear adhesive G3 coated on the surface of the encapsulation layer 204 has the lower viscous force, the third optically clear adhesive G3 has better flowability. While the imprinting roller 132 presses the optical film 1333 to imprint the fiber-optic plate 30, the third optically clear adhesive G3 in the region between the encapsulation layer 204 and the fiber-optic plate 30 flows to the chambers 3021 of the fiber-optic catheters 302 because of an extrusion effect and fills into the chambers 3021. Then, in the process of irradiating the UV light on the third optically clear adhesive G3, the portion of the third optically clear adhesive G3 in the chambers 3021 is also subjected to the light-curing reaction. Consequently, the fiber-optic catheters 302 are formed as solid light guide structures.

Then, the chip board 20 is baked (Step S108). In the step S108, a heating device 15 is employed to bake the first optically clear adhesive G1, the second optically clear adhesive G2 and the third optically clear adhesive G3 on the chip board 20 at 80 C.° for 15 minutes. Consequently, the light-curing reactions of the first optically clear adhesive G1, the second optically clear adhesive G2 and the third optically clear adhesive G3 are performed more completely.

Afterwards, the chip board 20 is cut to produce an optical fingerprint sensing unit 20' (Step S109). In the step S109, the imprinted chip board 20 is cut into plural individual optical fingerprint sensing units 20' by a laser cutting device 16.

The optical fingerprint sensing unit 20' comprises a substrate 200, an optical fingerprint sensing chip 201, a circuit pattern 202, an encapsulation layer 204 and a fiber-optic layer 30'. The circuit pattern 202 is formed on the surface of the substrate 200. The optical fingerprint sensing chip 201 is fixed on the substrate 200. Moreover, the optical fingerprint sensing chip 201 is electrically connected with the power supply circuit of the circuit pattern 202 through metal wires W. The encapsulation layer 204 is formed over the substrate 200 to cover the optical fingerprint sensing chip 201, the circuit pattern 202 and the metal wires W. The fiber-optic layer 30' is obtained from the fiber-optic plate 30 through the cutting process. The fiber-optic layer 30' is disposed over the encapsulation layer 204. Moreover, the fiber-optic layer 30' comprises plural fiber-optic catheters 302. The thickness of the encapsulation layer 204 is in the range between the 0.5 mm and 0.85 mm. The thickness of the fiber-optic layer 30' is in the range between 0.2 mm and 0.5 mm. In a preferred embodiment, the thickness of the fiber-optic layer 30' is 0.3 mm.

From the above descriptions, the present invention provides an optical fingerprint sensing unit and a manufacturing method thereof. In comparison with the conventional technology, the technology of the present invention is capable of simultaneously packaging and imprinting plural optical fingerprint sensing chip that are disposed on the substrate. Then, the imprinted chip board is cut into plural individual optical fingerprint sensing units through the laser cutting process. In other words, the technology of the present invention is industrially valuable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. An optical fingerprint sensing unit, comprising:
   a substrate;
   a circuit pattern formed on a surface of the substrate;
   an optical fingerprint sensing chip fixed on the substrate, wherein the optical fingerprint sensing chip is electrically connected with the circuit pattern through a metal wire;
   an encapsulation layer, wherein the optical fingerprint sensing chip, the circuit pattern and the metal wire are covered by the encapsulation layer; and
   a fiber-optic layer disposed on the encapsulation layer,
   wherein after a UV-curable optically clear adhesive is subjected to a light-curing reaction, the encapsulation layer is formed.

2. The optical fingerprint sensing unit according to claim 1, wherein the fiber-optic layer comprises plural fiber-optic catheters, and the plural fiber-optic catheters comprise plural chambers, respectively.

3. The optical fingerprint sensing unit according to claim 2, wherein the UV-curable optically clear adhesive is filled in the chambers, and the plural fiber-optic catheters are formed as solid light guide structures after the UV-curable optically clear adhesive is subjected to the light-curing reaction.

4. The optical fingerprint sensing unit according to claim 2, wherein a diameter of each fiber-optic catheter is in a range between 125 μm and 380 μm, and a diameter of the chamber is in a range between 10 μm and 200 μm.

5. The optical fingerprint sensing unit according to claim 4, wherein the diameter of each fiber-optic catheter is 125 μm, and the diameter of the chamber is 10 μm.

6. The optical fingerprint sensing unit according to claim 4, wherein the diameter of each fiber-optic catheter is 125 μm, and the diameter of the chamber is in a range between 50 μm and 100 μm.

7. The optical fingerprint sensing unit according to claim 4, wherein the diameter of each fiber-optic catheter is 385 μm, and the diameter of the chamber is 200 μm.

8. The optical fingerprint sensing unit according to claim 1, wherein a thickness of the encapsulation layer is in a range between 0.5 mm and 0.85 mm.

9. The optical fingerprint sensing unit according to claim 1, wherein a thickness of the fiber-optic layer is in a range between 0.2 mm and 0.5 mm.

* * * * *